United States Patent
Brotzmann et al.

(10) Patent No.: US 6,952,971 B2
(45) Date of Patent: Oct. 11, 2005

(54) APPARATUS FOR MEASURING A MASS FLOW

(75) Inventors: Karl Brotzmann, Amberg (DE);
Hans-Georg Fassbinder, Sulzbach-Rosenberg (DE); Hans Kopp, Sulzbach-Rosenberg (DE); Karsten Schutte, Amberg (DE)

(73) Assignee: Schenck Process GmbH, Darmstadt (DE)

( * ) Notice: Subject to any disclaimer, the term of this patent is extended or adjusted under 35 U.S.C. 154(b) by 0 days.

(21) Appl. No.: 10/362,270

(22) PCT Filed: Aug. 22, 2001

(86) PCT No.: PCT/DE01/03199
§ 371 (c)(1),
(2), (4) Date: Jul. 10, 2003

(87) PCT Pub. No.: WO02/16882
PCT Pub. Date: Feb. 28, 2002

(65) Prior Publication Data
US 2004/0011142 A1 Jan. 22, 2004

(30) Foreign Application Priority Data
Aug. 23, 2000 (DE) ......................................... 100 41 433

(51) Int. Cl.[7] ................................................. G01F 1/82
(52) U.S. Cl. .................................................. 73/861.353
(58) Field of Search ...................... 73/861.353, 861.351, 73/861.352, 861.354, 861.79, 861.81, 861.83

(56) References Cited

U.S. PATENT DOCUMENTS

| 3,521,959 | A | | 7/1970 | Fassel et al. |
| 4,700,578 | A | * | 10/1987 | Fassbinder ............. 73/861.354 |
| 4,821,581 | A | * | 4/1989 | Jost ........................ 73/861.351 |
| 5,047,612 | A | | 9/1991 | Savkar et al. |
| 5,294,798 | A | | 3/1994 | Hartman |
| 5,322,706 | A | | 6/1994 | Merkel et al. |
| 5,912,471 | A | | 6/1999 | Schütz |
| 6,348,232 | B1 | | 2/2002 | Chida et al. |
| 2004/0013813 | A1 | | 1/2004 | Lugscheider |

FOREIGN PATENT DOCUMENTS

| DE | 19857737 A1 | 5/2000 |
| EP | 1133580 B1 | 9/2001 |
| WO | WO 00/31313 | 6/2000 |

OTHER PUBLICATIONS

Grant, P.S. et al. (1989) "Monitoring of Deposit Surface Temperatures during Spray–Forming by Infrared Thermal Imaging" Scripta Metallurgica 23(10): 1651–1656.

* cited by examiner

Primary Examiner—Harshad Patel
Assistant Examiner—Corey D. Mack
(74) Attorney, Agent, or Firm—McDonnell Boehnen Hulbert & Berghoff LLP

(57) ABSTRACT

The invention relates to a device for measuring a mass flow, comprising a measuring wheel (3) that is supported by a shaft (4) and that is driven and impinged axially by the mass flow. Said wheel deflects the flow, giving it both radial and tangential speed components. The shaft bears an actuation spur wheel (7), which engages with an intermediate spur wheel (8) that is held in position by a force measuring device (14) and has a second meshing with a drive spur wheel (9) that is driven by a drive motor (13). The diameter of the actuation spur wheel (7) is more than 0.3 fold, preferably 0.5 to 1 of the diameter of the measuring wheel (3). This provides a device for measuring a mass flow, which has a high zero constant and thus a high degree of measuring precision, is cost-effective to produce, robust during operation and which has none of the disadvantages of prior art.

9 Claims, 3 Drawing Sheets

APPARATUS FOR MEASURING A MASS FLOW

This invention relates to an apparatus for measuring a preferably multiphase mass flow according to the preamble of claim 1.

In general, in such apparatus bulk material is fed axially onto a measuring wheel which has radially running guide vanes. The measuring wheel is driven at constant speed and the driving torque is measured. The deflection of the axially introduced bulk material leads to a change in the torque compared with the no-load torque. Changes in the mass flow of the bulk material likewise influence the torque wherein this change in the torque is a direct measure for the fluctuations of the bulk material flow. Such apparatus has a wide range of application in the pneumatic conveying of bulk material of any kind for such different areas of application as, for example, the iron and steel industry, the building materials industry or chemical process engineering etc.

In the known apparatus according to the preamble of the main claim, the torque or its variation is measured by means of a gear unit. For example, in U.S. Pat. No. 2,771,773 the torque acting on an intermediate shaft arranged between a drive motor and a measuring wheel is measured. This intermediate shaft is held fixed in its position by a spring which directly compensates the no-load torque. The larger torque which arises on application of a mass flow to the measuring wheel is compensated pneumatically. The pressure of a working gas required for this purpose and read off on a suitable measuring instrument is a measure for the transmitted torque. However, the proposed type of pressure regulation involves a comparatively high expenditure on equipment and thus an increased susceptibility to breakdown. Also disadvantageous is the system-dependent long dead time which is required for the pressure build-up to compensate for the torque and makes it difficult to regulate pulsating flows of bulk material.

A certain improvement is achieved if, in accordance with EP 0 474 121 B1, the intermediate shaft is suspended on a force-measuring device tangentially moveably to the shaft of the measuring wheel or to the axle of the driving spur wheel of the drive motor. However, the aim of EP 0 474 121 B1 is to make the measuring device usable for the measurement of smaller mass flows with the disturbing influences of friction in the gears, caused for example by the temperature-dependent changes in viscosity of the gear oil, being largely eliminated. A similar formulation of the problem had already been described in DE 35 07 993 C2. Disadvantages of the relatively expensive gearing designs proposed in DE 35 07 993 C2 and EP 0 474 121 B1 are the cost-intensive manufacture and the susceptibility to breakdown caused by the plurality of moving parts.

In the apparatus described in DE 35 07 993 C2 and EP 0 474 121 B1 it is desired that the force effect of the intermediate shaft on the force-measuring device should be as large as possible. For this reason, the shaft carrying the measuring wheel carries a driving spur wheel having the smallest possible diameter. In practice, however, this embodiment has the decisive disadvantage of a low zero-point constancy, i.e., fluctuations of the torque occur even during idling. However, an adequate zero-point constancy is a prerequisite for measuring low mass flows in the range of 10 kg/min with a high accuracy. In addition, a high zero-point constancy ensures that even small changes in the measured mass flows can be reliably detected.

EP 0 857 953 A1 describes a reduction in the measurement error, especially during the measurement of inhomogeneous materials. By means of an axially centric supply of material into the measuring wheel and modifying the geometry of the measuring wheel, an attempt is made to avoid the disadvantage of a lateral supply of material and achieve an enhanced measurement accuracy. In practice, such forms of measuring wheel are already known. The geometries described are found to be especially advantageous for fibrous material. An increased zero-point constancy and improvement in the measurement accuracies cannot be achieved for small mass flows in the range of 10 kg/min. The measuring wheel geometry described has the disadvantage of requiring high precision in the manufacture and requiring protection against wear in the case of abrasive materials in order to ensure the precision required for the measurement accuracy in long-term operation.

In all known embodiments the bulk material is deflected such that the outlet of the measured bulk material does not lie on the perpendicular axis below the bulk material inlet. This primarily prevents usage in those cases where a measuring apparatus is to be built into existing installations. There the apparatus is typically built in below a storage container, where the given guidance of the piping requires aligning flanges between the bulk material inlet and outlet, and the maximum overall height of the apparatus is severely limited. Said aspects impede the wide-spread applicability of the principle for many conceivable applications for the measurement of multiphase mass flows.

The object of the present invention is thus to provide an apparatus for measuring a mass flow with high zero-point constancy and thus with high measurement accuracy which can be manufactured at favourable cost, is robust in operation and avoids the disadvantages of the prior art.

This object is achieved by an apparatus for measuring a mass flow having the features of claim 1. Advantageous embodiments of the invention are described in the dependent claims.

According to the invention, an apparatus for measuring a mass flow is provided with a measuring wheel borne by a shaft, wherein the measuring wheel is driven and is acted upon axially by the mass flow, deflects this flow and imparts thereto a radial as well as tangential velocity component. The braking moment caused by the mass flow thereby serves to quantify the mass flow. The shaft carries a driving spur wheel which meshes with an intermediate spur wheel which is held fixed in its position by a force measuring device and has a second meshing with a driving spur wheel driven by a drive motor, wherein the diameter of the driving spur wheel is greater than 0.3 times, preferably 0.5 times to once the diameter of the measuring wheel.

It has surprisingly been found that by means of this measure the zero-point constancy is improved substantially and the measurement accuracy increases accordingly. An expansion of the measurement range into the range of smaller mass flows is thereby made possible. The influence of friction caused by the temperature-dependent changes in viscosity of the gear oil however have far less influence on the measurement accuracy than assumed so far, at least in the temperature range above 0° C. Thus, the known measures for compensating for frictional influences can be dispensed with in a broad temperature range. An apparatus according to the invention thus merely consists of a simply constructed measuring gear unit having a low susceptibility to breakdown, whereby in addition to higher measurement accuracy, there are cost advantages in manufacture and operation.

The apparatus according to the invention is advantageously provided for measuring a preferably multiphase bulk material flow. Bulk material flows in the range of 5 t/h to 30 t/h are typically measured. However, the apparatus according to the invention can also be used to measure small bulk materials flows.

When dimensioning the driving spur wheel, it should naturally be borne in mind that a larger spur wheel diameter initially leads to a lower measuring force on the intermediate shaft. In an advantageous embodiment of the invention, in the force-measuring device holding the intermediate shaft, the measuring force is guided via a leverage supported axially parallel to the intermediate shaft with the aim of increasing the measuring force at the force transducer. The lower measuring force at the intermediate shaft resulting from an enlarged driving spur wheel compared with the prior art is compensated in this fashion. Since the bulk material is in any case accelerated radially outwards in the measuring channels and a renewed deflection of the bulk material flow only takes place at the outer edge of the measuring wheel, it is possible to have gear structures where the driving spur wheel has approximately the diameter of the measuring wheel without any significant additional resistance opposing the bulk material. As a rule however, a sufficient zero-point constancy is to be achieved even with smaller diameters. The force guidance via a leverage also allows the use of force transducers adapted to the intended usage. Commercial force transducers with measuring ranges below 50 N are only suitable for laboratory operation. In an apparatus according to the invention the leverage can be selected such that even for small mass flows it is possible to use force transducers suitable for industrial use with measuring ranges above 50 N so that extremely small mass flows, less than or equal to 10 kg/min, can be measured accurately even in industrial use.

In a further advantageous embodiment the measuring gear unit is accommodated in a cross-beam that protrudes into the bulk material flow. It is advantageous for this arrangement if the inlet and outlet points of the bulk material lie directly one below the other in alignment. In addition, this arrangement has only a very low overall height which corresponds, for example, to twice the diameter of the measuring wheel. The apparatus according to the invention can thus easily be built into an existing installation by simply replacing a short straight pipe section by the apparatus.

Finally, a further advantageous embodiment of the present invention provides that the drive motor is constructed as an electric asynchronous motor. By using an asynchronous motor, a favourably priced and almost maintenance-free drive solution is made available. In this case, the measuring wheel is not driven at constant speed, which is why the drive shaft of the drive motor and/or the motor itself are coupled to a revolution counter. By comparing or recording the change in speed of the drive motor speed during the measurement, the braking moment and thus the magnitude of the mass flow can be determined.

In an advantageous further development the shaft of the drive motor can be arranged offset by 60° to 120°, preferably by 90° to the longitudinal axis of the housing. By this means, an especially space-saving method of construction can be implemented.

Further developments and advantages of the invention are explained by describing the embodiments with reference to the appended drawings wherein.

Figure 1:
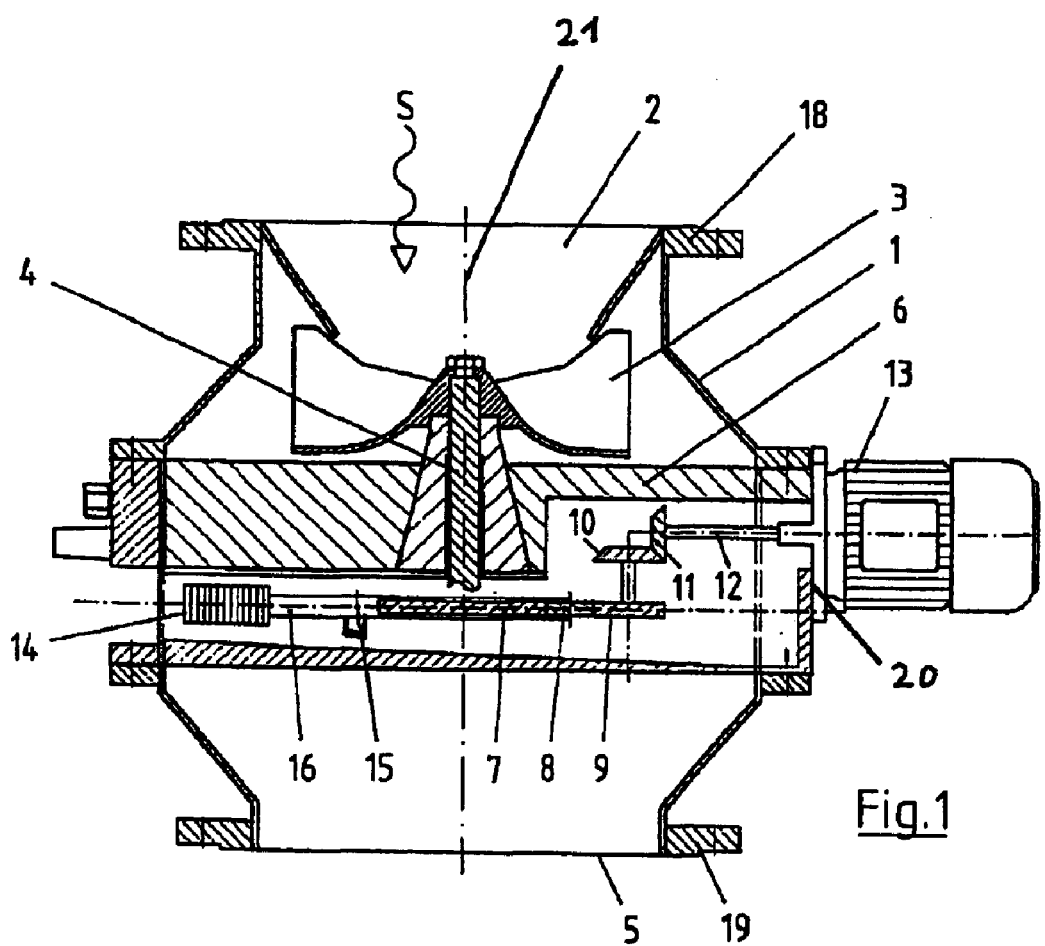
FIG. 1 is a schematic side view of a section through an apparatus according to the invention.

The apparatus according to the invention shown as a schematic cutaway side view in FIG. 1 consists of a housing 1 which is configured in the present case as a welded structure. The housing 1 is constructed as substantially rotationally symmetric and corresponds to two truncated cones with their bases standing one on top of the other.

At its upper end the housing 1 has a circular material inlet opening 2 bordered by a circular flange 18. At its lower end the casing 1 has a circular outlet opening 5 also bordered by a circular flange 19.

On one side of the housing 1 there is also provided a driving flange 20 to accommodate a drive motor 13.

Below the material inlet opening 2 on the inside the housing 1 has a measuring wheel 3 provided with radial guide vanes coaxial to the longitudinal axis of the housing 21. In the present embodiment the vanes are slightly profiled.

In the plane of the drawing the measuring wheel 3 is arranged rotatably at the upper end of a vertical shaft 4. The flow of bulk material S flowing in axially through the inlet opening 2 onto the measuring wheel 3 is deflected by the measuring wheel 3 in the radial direction and accelerated both in the radial and in the tangential direction. The bulk material ejected or falling from the measuring wheel 3 is deflected to the wall of the housing 1 and extracted from the housing 1 through the outlet opening 5.

The deflection and acceleration of the bulk material flow onto the measuring wheel 3 causes a braking moment at the shaft 4 which is directly proportional to the bulk material flow. The bulk material flow is measured by means of a spur gear unit arranged in a gear housing 6, consisting of a driving spur wheel 7 arranged at the lower end of the shaft 4, a moveable intermediate spur wheel 8 held in its position by a force-measuring device 14 and a driving spur wheel 9. In the present embodiment the diameter of the driving spur wheel 7 is 0.5 times the diameter of the measuring wheel 3.

In the embodiment shown the driving spur wheel 9 is driven via two bevel gears 10, 11 by a shaft 12 of a drive motor 13 offset by 90° to the axis of the driving spur wheel 9. By this means the measuring wheel 3 moves at constant speed. The deflection of the driving torque by 90° allows an especially space-saving method of construction of the apparatus according to the invention. However, the shaft of the driving spur wheel 9 can also, for example, be driven directly by the motor 13 or can be connected to the motor 13 in a known fashion via a gear unit, a chain, a cog belt etc.

Figure 2:
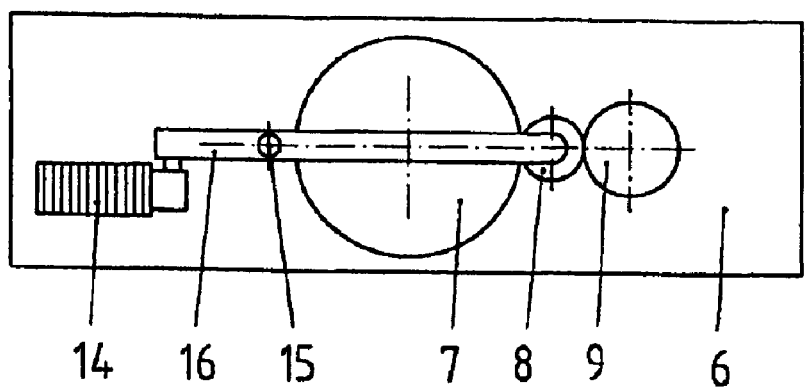
FIG. 2 is a schematic top view of the gear unit of the apparatus according to the invention from FIG. 1.

FIG. 2 shows a schematic top view of the gear unit of the apparatus according to the invention from FIG. 1. The movable intermediate spur wheel 8 is held in its position here via a leverage from the force-measuring device 14. The force-measuring device 14 is, for example, a commercial force transducer. The leverage consists of a lever arm 16 supported in the bearing 15 axially parallel to the intermediate spur wheel 8. The leverages are determined by the different distances between the bearing 15 and the intermediate spur wheel 8 on the one hand and the bearing 15 and the force-measuring device 14 on the other hand. The lower measuring force at the intermediate spur wheel 8 resulting from the enlarged driving spur wheel 7 compared with the prior art is compensated by the choice of suitable leverages. The force-measuring device 14 shown in FIGS. 1 and 2 is a commercial bending-rod or torsion weighing cell.

Figure 3:
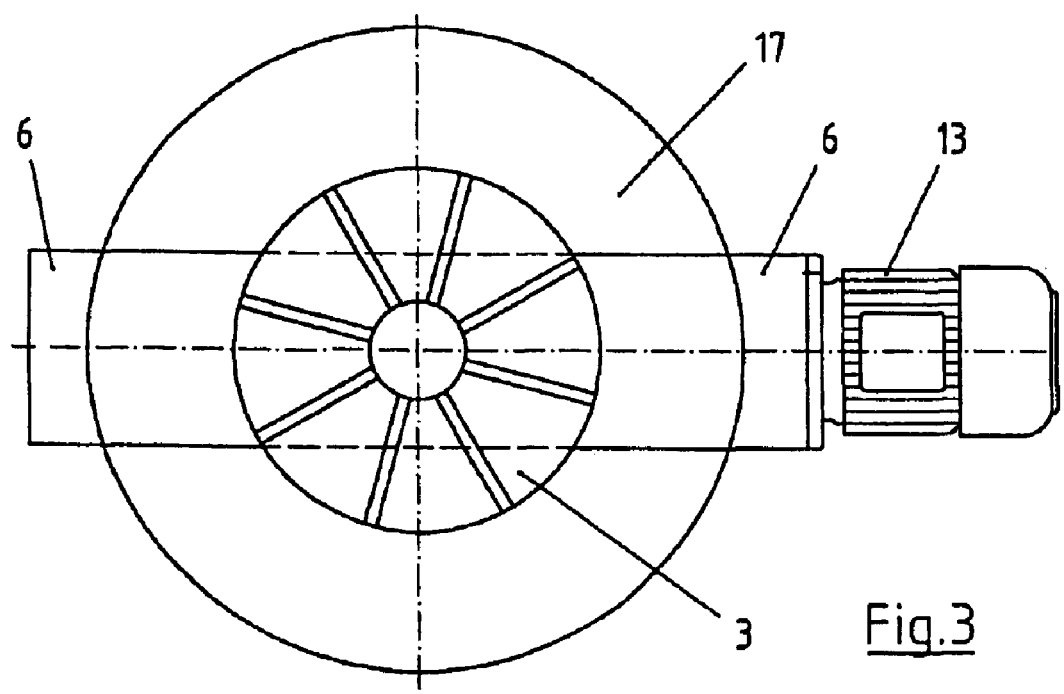
FIG. 3 is a schematic top view of the apparatus according to the invention from FIG. 1.

FIG. 3 shows a top view of the advantageous embodiment from FIG. 1. Here the gear housing 6 is arranged in the housing 1 such that only a small part of the area 17 available for free passage of bulk material after deflection in the measuring wheel 3 is blocked by the housing 6. Assembly in existing installations is accomplished more favourably by means of a flange 18 at the inlet opening 2 or by means of a flange 19 at the outlet opening 5. The flanges 18 and 19 are located in alignment and thus facilitate straightforward insertion in an existing pipe or the like.

FIG. 3 also shows that the diameter of the driving spur wheel 7 can approximately correspond to that of the measuring wheel 3 to achieve an especially high zero-point constancy without an additional obstacle for the bulk material flow being formed thereby. The resulting lower measuring force at the intermediate spur wheel 8 could be compensated, for example, by a suitable configuration of lever arm 16 and bearing 15. Tests have shown, however, that a driving spur wheel 7 having 0.5 times the diameter of the measuring wheel 3 already yields a satisfactory zero-point constancy and an apparatus according to the invention with this size ratio has an extremely compact structure. The overall height here is approximately twice the diameter of the measuring wheel.

LIST OF REFERENCE SYMBOLS

1 Housing
2 Material inlet opening
3 Measuring wheel
4 Shaft
5 Outlet opening
6 Gear housing
7 Driving spur wheel
8 Intermediate spur wheel
9 Driving spur wheel
10 Bevel gear
11 Bevel gear
12 Shaft
13 Drive motor
14 Force measuring device
15 Bearing
16 Lever arm
17 Free area
18 Flange at inlet opening
19 Flange at outlet opening
20 Driving flange
21 Longitudinal axis of housing
S Bulk material flow

What is claimed is:

1. An apparatus for measuring a mass flow with a driven measuring wheel carried by a shaft, and impinged upon axially by the mass flow, wherein the shaft also bears a driving spur wheel which meshes with an intermediate spur wheel, wherein the intermediate spur wheel is held in its position by a force-measuring device and meshes with a operative spur wheel which is driven by a drive motor, wherein the diameter of the driving spur wheel is greater than 0.3 times the diameter of the measuring wheel, characterized in that:

(a) a leverage supported axially parallel to the shaft of the intermediate spur wheel for the force-measuring device in order to transmit the measuring force;
   (b) at least the driving spur wheel of the shaft and the intermediate spur wheel are arranged on a crossbeam which protrudes into the mass flow in the gear housing;
   (c) the housing of the apparatus has a low overall height which is small than or equal to twice the diameter of the measuring wheel and
   (d) the inlet opening for the material and the outlet opening of the mass flow in the housing are arranged directly one below the other in alignment.

2. The apparatus for measuring a mass flow according to claim 1, characterized in that:
   the apparatus is provided for measuring a preferably multiphase flow of bulk material.

3. The apparatus for measuring a mass flow according to claim 1, characterized in that:
   the apparatus is provided for measuring very small mass flows, less than or equal to 10 kg/min.

4. The apparatus for measuring a mass flow according to claim 1, characterized in that:
   the shaft of the drive motor is arranged offset by 60° to 120°, preferably by 90° to the longitudinal axis of the housing.

5. The apparatus for measuring a mass flow according to claim 1, characterized in that
   the apparatus is provided for measuring a preferably multiphase flow of bulk material.

6. The apparatus for measuring a mass flow according to claim 1, characterized in that drive motor is designed as an electric asynchronous motor.

7. The apparatus for measuring a mass flow according to claim 1, wherein the leverage is supported axially at a single axial support point located between the force-measuring device and the intermediate spur wheel.

8. The apparatus for measuring a mass flow according to claim 7, wherein the leverage may be changed by varying the distance between the intermediate spur wheel and the single axial support point and/or the force measuring device and the single support point.

9. A method for measuring a mass flow, particularly a multiphase flow of bulk material, wherein the apparatus used for executing the measuring method comprises a driven measuring wheel carried by a shaft driven by an asynchronous motor and impinged upon axially by the mass flow, wherein the shaft also bears a driving spur wheel which meshes with an intermediate spur wheel, wherein the intermediate spur wheel is held in a position by a force-measuring device and meshes with a operative spur wheel which is driven by an asynchronous motor, wherein the drive shaft and/or the motor are coupled with a speed counter and wherein the measuring method comprises the following steps:

(a) detecting the force produced on the force measuring device;
   (b) detecting the deviation of speed of the drive speed by means of the speed counter;
   (c) detecting the breaking moment from the force measured at the force measuring device; and
   (d) calculating the mass flow from the breaking moment and the speed.

* * * * *